(12) United States Patent
Kamruzzaman et al.

(10) Patent No.: US 12,247,541 B2
(45) Date of Patent: Mar. 11, 2025

(54) WIND TURBINE ROTOR BLADE CONFIGURED FOR REDUCED TRAILING EDGE NOISE

(71) Applicant: Vestas Wind Systems A/S, Aarhus N. (DK)

(72) Inventors: Mohammad Kamruzzaman, Southampton (GB); Jeremy Hurault, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/609,065

(22) PCT Filed: May 5, 2020

(86) PCT No.: PCT/DK2020/050130
§ 371 (c)(1),
(2) Date: Nov. 5, 2021

(87) PCT Pub. No.: WO2020/224737
PCT Pub. Date: Nov. 12, 2020

(65) Prior Publication Data
US 2022/0186705 A1    Jun. 16, 2022

(30) Foreign Application Priority Data

May 8, 2019   (DK) .......................... PA 2019 70296

(51) Int. Cl.
*F03D 1/06*   (2006.01)

(52) U.S. Cl.
CPC .... *F03D 1/0633* (2013.01); *F05B 2240/3042* (2020.08); *F05B 2260/96* (2013.01)

(58) Field of Classification Search
CPC ................ F03D 1/0633; F03D 1/0675; F05B 2240/122; F05B 2240/304; F05B 2240/3062; F05B 2260/209
See application file for complete search history.

(56) References Cited

U.S. PATENT DOCUMENTS 11,220,993 B2 *   1/2022   Asheim ..................... B32B 3/30
2013/0164141 A1   6/2013   Lin et al.
(Continued)

FOREIGN PATENT DOCUMENTS

| CN | 105980701 A | 9/2016 |
| CN | 106246478 A | 12/2016 |

(Continued)

OTHER PUBLICATIONS

Danish Patent and Trademark Office, Search and Examination Report in PA 2019 70296, Nov. 8, 2019.
(Continued)

*Primary Examiner* — Sang K Kim
(74) *Attorney, Agent, or Firm* — Wood Herron & Evans LLP

(57) ABSTRACT

Wind turbine rotor blade with reduced trailing edge noise A wind turbine rotor blade is described, the rotor blade extending in a spanwise direction between a root end and a tip end, and extending in a chordwise direction between a leading edge and a trailing edge. The rotor blade comprises a series of serrations projecting from the trailing edge, each serration extending from a base to a tip to define a length of the serration. The rotor blade also comprises a respective distinct set of fins associated with, and arranged adjacent to, each of the serrations, each fin projecting from a surface of the blade and extending between a leading end and a trailing end to define a length of the fin. Each set of fins comprises multiple fins whose trailing ends are in spanwise alignment with, and are located at or upstream of, the base of the (Continued)

serration associated with the set. For each set of fins, each fin of the set has a greater length than the serration associated with the set, and the trailing end of at least one fin lies between spanwise edges of the serration associated with the set.

22 Claims, 4 Drawing Sheets

(56) References Cited

U.S. PATENT DOCUMENTS

| | | | |
|---|---|---|---|
| 2015/0078896 | A1 | 3/2015 | Oerlemans |
| 2016/0369775 | A1 | 12/2016 | Gonzalez et al. |
| 2017/0045031 | A1* | 2/2017 | Asheim ................. F03D 1/0633 |
| 2017/0122286 | A1* | 5/2017 | Alexander ............ F03D 1/0675 |
| 2019/0353142 | A1* | 11/2019 | Arce ..................... F03D 7/0296 |
| 2020/0003177 | A1* | 1/2020 | Oerlemans ............ F03D 1/0675 |

FOREIGN PATENT DOCUMENTS

| | | | |
|---|---|---|---|
| CN | 109931212 | A | 6/2019 |
| EP | 2851555 | A1 | 3/2015 |
| EP | 2921697 | A1 | 9/2015 |
| EP | 3348826 | A1 | 7/2018 |
| WO | 2015169471 | A1 | 11/2015 |
| WO | 2017044099 | A1 | 3/2017 |

OTHER PUBLICATIONS

European Patent Office, International Search Report and Written Opinion in PCT Application No. PCT/DK2020/050130, Jul. 17, 2020.

China National Intellectual Property Administration, office action issued in corresponding Chinese patent application No. 202080049157.7, dated May 4, 2023, with English translation.

China National Intellectual Property Administration, second office action issued in correposnding CN Application No. 202080049157.7, dated Sep. 7, 2023.

China National Intellectual Property Administration, Decision of Rejection issued in corresponding CN Application No. 202080049157.7, dated Jan. 31, 2024, with English translation.

Chinese Patent Office, Notice of Reexamination issued in corresponding CN Application No. 202080049157.7 dated Oct. 31, 2024.

* cited by examiner

WIND TURBINE ROTOR BLADE CONFIGURED FOR REDUCED TRAILING EDGE NOISE

TECHNICAL FIELD

The present invention relates generally to wind turbine rotor blades and to improved methods of manufacturing wind turbine rotor blades. In particular, the invention relates to rotor blades configured to generate less trailing edge noise, in use.

BACKGROUND

The blades of modern utility-scale wind turbines typically have an airfoil profile along most of their length, defining a pressure side and a suction side of the blade. In use, as the rotor turns air flows across the surfaces of the blade from a leading edge of the blade to a trailing edge. Airflow within a boundary layer developed around the blade surfaces is initially laminar, but typically becomes turbulent before air reaches the trailing edge.

As the boundary layer transitions from laminar to turbulent it generates vortices in the process. These vortices then pass over and interact with the trailing edge, with audible noise being produced as the vortices are scattered. Such trailing edge noise is one of the most significant sources of noise in wind turbines.

There is a general aim to reduce noise from wind turbines, and some measures are known to mitigate trailing edge noise specifically. For example, serrated trailing edges have been proposed, in which a series of serrations or teeth project from the trailing edge to impart a sawtooth profile on the trailing edge. The momentum and turbulent energy of the vortices are redistributed and thus dissipated at the tips and side edges of the serrations, which reduces the extent to which vortices are scattered and so attenuates the associated noise.

The effectiveness of serrations in reducing noise depends to some extent on the angle at which air flows across them. For this reason, ribs or other formations may be added to serrations to guide airflow towards the serration tips, for example. Such formations are generally at least partially disposed on the serrations themselves to optimise airflow guidance.

Even when perfectly aligned to the airflow, a serration can only dissipate a portion of the momentum and turbulent energy of a vortex, that portion being limited primarily by the geometry of the serration. In turn, the serration geometry is constrained by other factors, in particular the load that the serrations impart on the blade. So, for example, while longer serrations may be more effective at reducing trailing edge noise, they also exert a greater load on the blade. Serration design must therefore strike a balance between these conflicting requirements.

In general terms, therefore, there is potential to reduce trailing edge noise further than is achievable with known serrated trailing edge approaches. It is against this background that the present invention has been devised.

SUMMARY OF THE INVENTION

According to a first aspect of the present invention there is provided a wind turbine rotor blade. The rotor blade extends in a spanwise direction between a root end and a tip end, and extends in a chordwise direction between a leading edge and a trailing edge. The rotor blade comprises: a series of serrations projecting from the trailing edge, each serration extending from a base to a tip to define a length of the serration; and a respective distinct set of fins associated with, and arranged adjacent to, each of the serrations, each fin projecting from a surface of the blade and extending between a leading end and a trailing end to define a length of the fin. Each set of fins comprises multiple fins whose trailing ends are in spanwise alignment with, and are located at or upstream of, the base of the serration associated with the set. For each set of fins, each fin of the set has a greater length than the serration associated with the set, and the trailing end of at least one fin lies between spanwise edges of the serration associated with the set.

Each fin may have a length corresponding to at least 10% of a blade chord at the spanwise position of the fin, and optionally 20% of the blade chord.

Each leading end of each fin may be positioned downstream of a transition point defined in accordance with a rated speed of the blade. For example, each leading end may be spaced from the transition point by between 10% and 30% of the blade chord.

Each serration optionally has a length that is between 3% and 20%, optionally between 3% and 19.98%, and further optionally between 3% and 8%, of a blade chord at the spanwise position of the serration.

Respective trailing ends of two or more of the fins may lie between spanwise edges of each serration. In particular, respective trailing ends of three or more of the fins may lie between spanwise edges of each serration.

The fins may be spaced from each other according to their respective heights. For example, each pair of adjacent fins within the set of fins may be spaced by a gap no larger than half of the height of one of the fins of the pair.

Each set of fins may comprise at least three fins, or at least four fins. The trailing ends of the fins are in spanwise alignment with the base of the serration associated with the set The fins may be disposed entirely upstream of the respective serrations with which they are aligned, in that the ends of the fins coincide with or are spaced from respective bases of the serrations. In particular, for each set of fins, the trailing ends of at least one fin may coincide with the base of the serration associated with the set.

Optionally, at least some of the fins are disposed on a suction side of the blade. Similarly, at least some of the fins may be disposed on a pressure side of the blade.

Another aspect of the invention provides a wind turbine comprising the rotor blade of the above aspect.

Another aspect of the invention provides a method of manufacturing a wind turbine rotor blade, for example the rotor blade of the above aspect. The rotor blade extends in a spanwise direction between a root end and a tip end, and extends in a chordwise direction between a leading edge and a trailing edge. The method comprises arranging a series of serrations to project from the trailing edge, each serration extending from a base to a tip to define a length of the serration. The method further comprises arranging a plurality of fins to project from a surface of the blade, each fin extending between a leading end and a trailing end to define a length of the fin, each fin belonging to a respective distinct set of fins associated with, and arranged adjacent to, each of the serrations. Each set of fins comprises multiple fins whose trailing ends are in spanwise alignment with, and are located at or upstream of, the base of the serration associated with the set. For each set of fins, each fin of the set has a greater length than the serration associated with the set, and the trailing end of at least one fin lies between spanwise edges of the serration associated with the set.

The method may comprise determining the length of each serration in accordance with a height of a fin of a set of fins associated with the serration.

The method may comprise determining a width of each serration at its base as a function of the length of the serration.

The method may comprise determining a spanwise thickness of each fin as a function of a height of the fin.

Another aspect of the invention provides a wind turbine comprising a rotor blade manufactured according to the method of the above aspect.

BRIEF DESCRIPTION OF THE DRAWINGS

The present invention and further relevant background will now be described by way of non-limiting examples, with reference to the accompanying figures, in which like features are assigned like reference numerals and in which.

DETAILED DESCRIPTION

In general terms, embodiments of the invention provide wind turbine rotor blades having serrated trailing edges for reduced trailing edge noise. These embodiments improve upon known approaches for combating generation of noise at a trailing edge by combining the serrated trailing edge with surface formations such as fins lying upstream of the serrations.

In this respect, it is noted that references to 'upstream' and 'downstream' throughout this description relate to an expected airflow direction across the blade when the blade is in use, namely from the leading edge towards the trailing edge.

The fins are configured to slice or otherwise break up trailing edge bound vortices within a turbulent boundary layer, thus dissipating some of the turbulent energy in the vortices before they reach the serrations. Accordingly, the combination of fins and serrations provides a two-stage noise reduction arrangement that reduces trailing edge noise to a greater extent than is possible with serrations alone.

Unlike known approaches that employ ribs for guiding airflow towards the serration tips, the fins used in embodiments of the invention are disposed entirely upstream of the respective serrations with which they are aligned, in that the ends of the fins coincide with or are spaced from respective bases of the serrations. Positioning the fins so that they do not overlap the serrations eliminates the potential for noise to be generated by interaction of flow between fins and serrations in regions of overlap, which can be a problem in prior art approaches employing ribs to guide airflow along serrations, for example.

Although the fins may be spaced from the serrations, arranging each fin to terminate at the base of the serration that it is aligned with helpfully avoids a whistling effect that is possible if there is a significant gap between the fin and the serration.

Before describing an example arrangement of fins and serrations in detail, an application in which rotor blades of the invention may be used shall first be described to set the invention in context.

Figure 1:
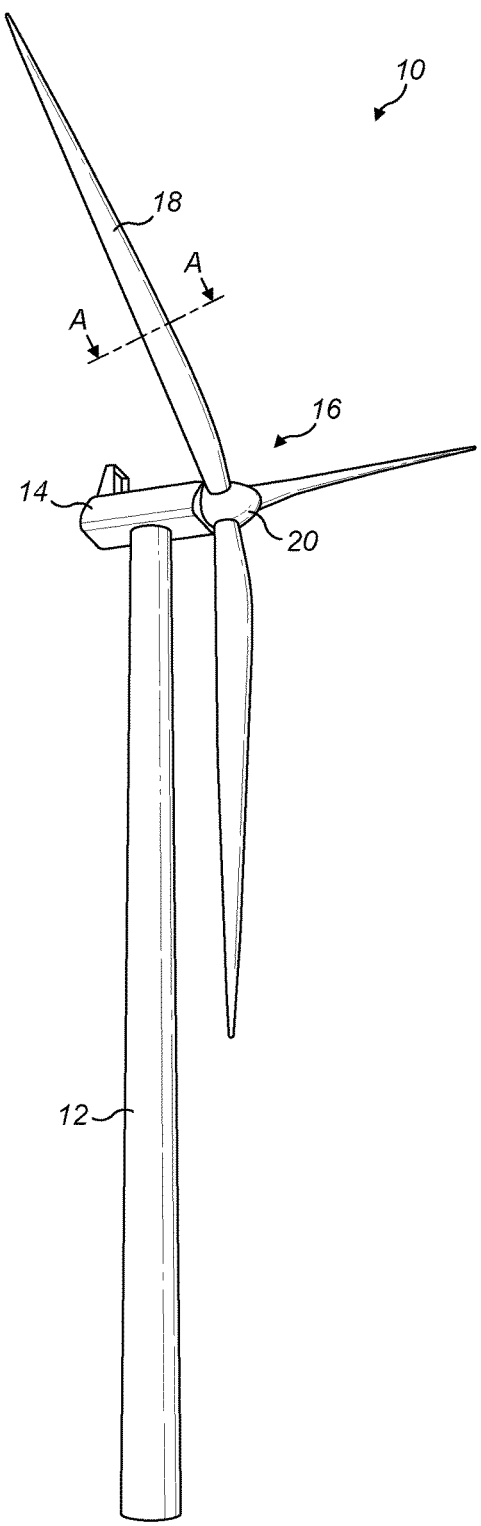
FIG. 1 shows an example of a wind turbine.

In this respect, FIG. 1 shows an example of a wind turbine 10. The wind turbine 10 comprises a tower 12 supporting a nacelle 14 at its upper end. A rotor 16 is mounted to the nacelle 14. The rotor 16 comprises three rotor blades 18, which are attached to and extend radially from a central hub 20.

Figure 2:
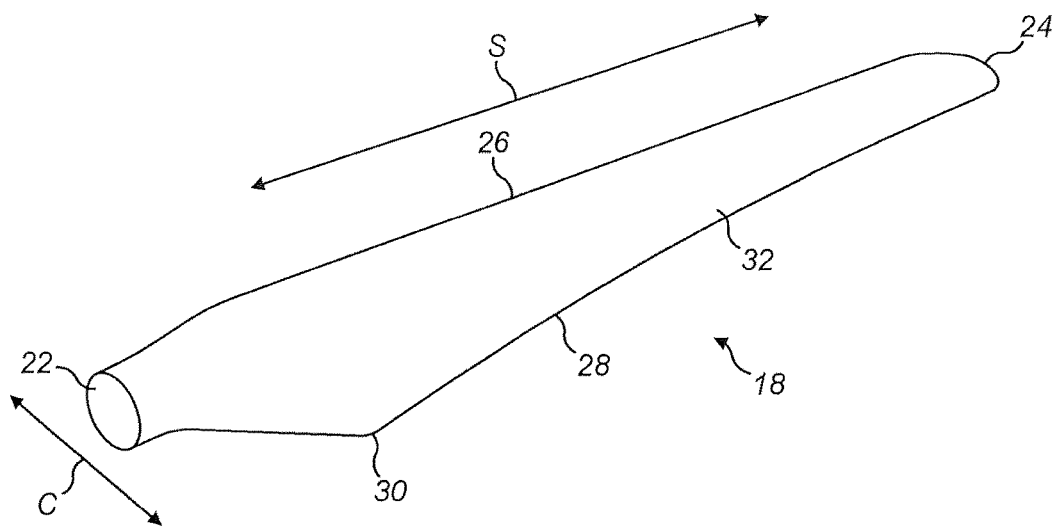
FIG. 2 is a perspective view of a rotor blade of the wind turbine of FIG. 1.

FIG. 2 is a perspective view of one of the blades 18 of the wind turbine 10, although the fins and serrations mentioned above are not shown in this figure, these features instead being shown in FIGS. 3 to 8. In FIG. 2, the blade 18 extends from a generally circular root end 22 to a tip end 24 in a longitudinal or 'spanwise' direction S, and between a leading edge 26 and a trailing edge 28 in a transverse or 'chordwise' direction C. In use, air flows from the leading edge 26 towards the trailing edge 28 as the rotor 16 turns relative to the nacelle 14.

The blade 18 transitions from a circular profile to an airfoil profile moving in the spanwise direction S from the root end 22 of the blade 18 towards a shoulder 30 of the blade 18, the shoulder 30 being the widest part of the blade 18 where the blade chord is at a maximum. Beyond the shoulder 30, the blade 18 has an airfoil profile that tapers in the chordwise direction towards the trailing edge 28. Thus, the blade 18 has progressively decreasing thickness in the chordwise direction in an outboard portion defining a trailing edge region 32, which extends from the shoulder 30 to the tip 24 of the blade 18.

Figure 3:
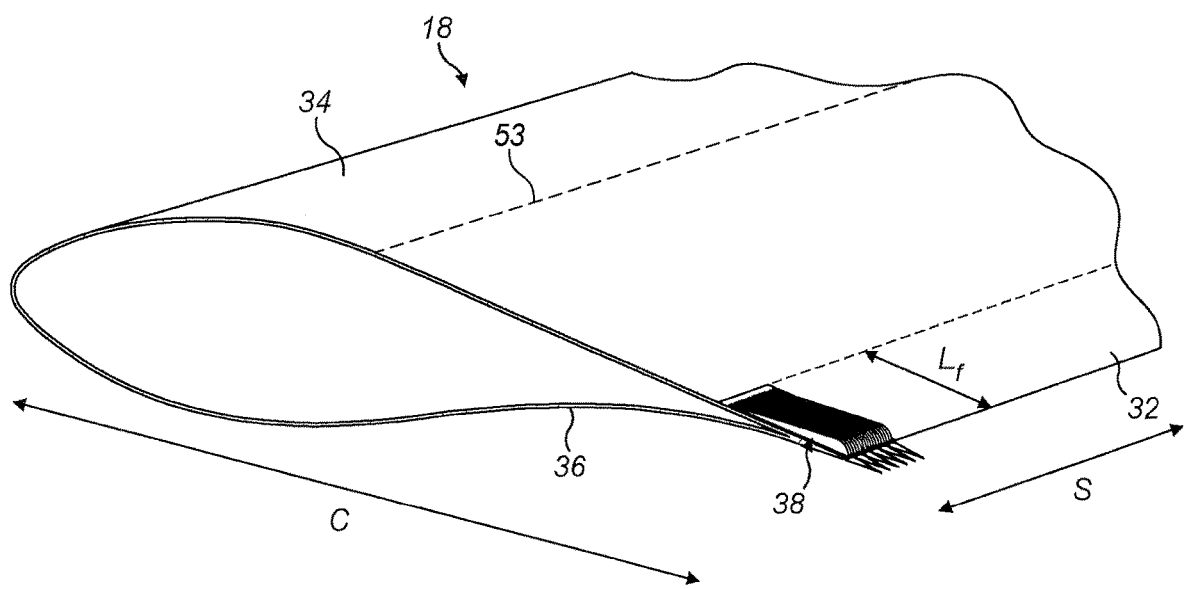
FIG. 3 is a perspective cross-sectional view of the rotor blade of FIG. 2 taken along the line A-A in FIG. 1.

The airfoil profile of the blade 18 is shown more clearly in FIG. 3, which is a sectional view of the blade 18 in a chordwise plane corresponding to line A-A in FIG. 1. As the skilled reader will appreciate, the airfoil profile defines a suction side 34, shown uppermost in FIG. 3, and a pressure side 36, which corresponds to the underside of the blade 18 in the orientation depicted in FIG. 3.

The blade 18 is generally embodied as a hollow shell, which is typically formed from two half shells of composite material such as glass-fibre reinforced plastic (GRP), most often as a pressure side, or 'windward', half shell, and a suction side, or 'leeward', half shell. Each half shell is moulded, for example in a vacuum assisted resin transfer moulding (VARTM) process, before being joined to the other half shell to form the blade shell.

In use, due to the airfoil profile and an angle of attack of the blade 18, lift is generated as air flows from the leading edge 26 to the trailing edge 28 across the suction and pressure sides 34, 36, therefore inducing rotation of the blade 18 around the hub 20.

As noted above, in embodiments of the invention a combination of serrations and fins are used to mitigate trailing edge noise. Such serrations and fins may be formed integrally with the blade 18, for example. Alternatively, the serrations and/or the fins may be fabricated as part of one or more subassemblies that are attached to the trailing edge 28 of the blade 18.

FIG. 3 shows such a subassembly, namely a trailing edge module 38 that is attached to the suction side 34 of the blade 18 at the trailing edge 28. It is noted that such a trailing edge module 38 may additionally be installed on the pressure side 36 of the blade 18, although the priority is to apply noise reduction on the suction side 34 as trailing edge noise is predominantly caused by airflow over the trailing edge 28 from the suction side 34, because the boundary layer over the suction side 34 tends to be thicker than the boundary layer over the pressure side 36.

Similarly, most trailing edge noise is generated in the radially outer regions of the rotor 16 where the relative airflow speed across the blade 18 is highest, and so trailing edge modules 38 are concentrated in this region.

In this example, the trailing edge module 38 is a single-piece moulded component formed from a plastic, such as ABS plastic, although in other examples the trailing edge module may be machined from a block of aluminium, for example, or formed by an additive manufacturing process.

Figure 4:
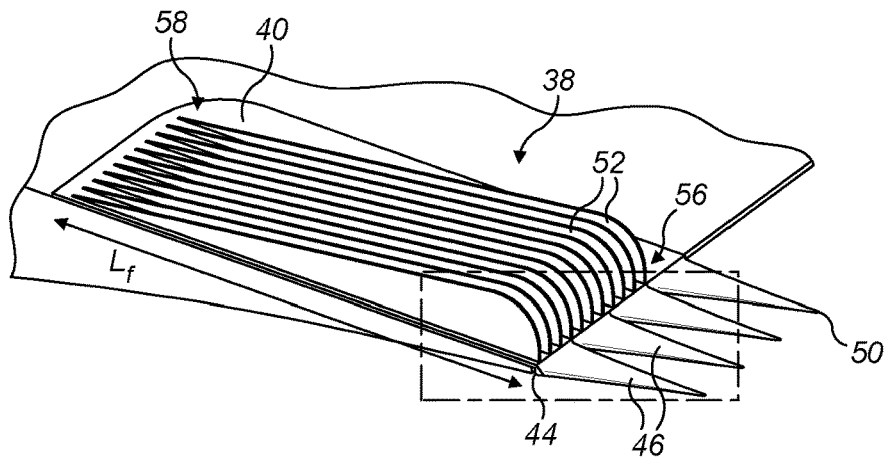
FIG. 4 corresponds to FIG. 3 and is a detail view of part of a serrated trailing edge of the rotor blade.
Figure 5:
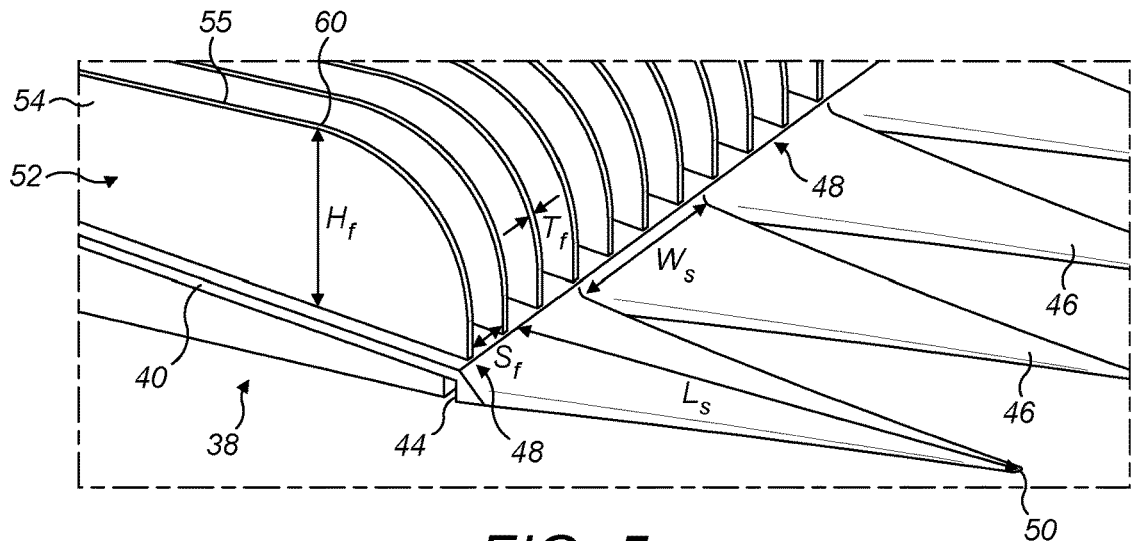
FIG. 5 is a detail view of a portion of the serrated trailing edge highlighted in FIG. 4.
Figure 6:
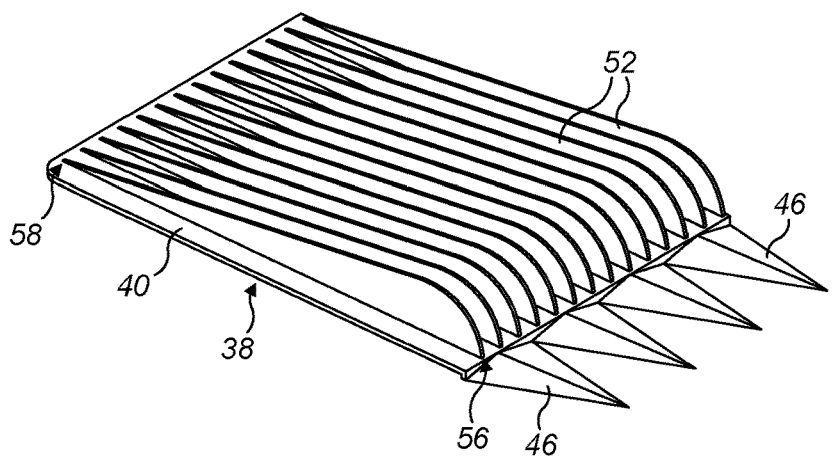
FIG. 6 is a perspective view of a trailing edge module in accordance with an embodiment of the invention.
Figure 7:
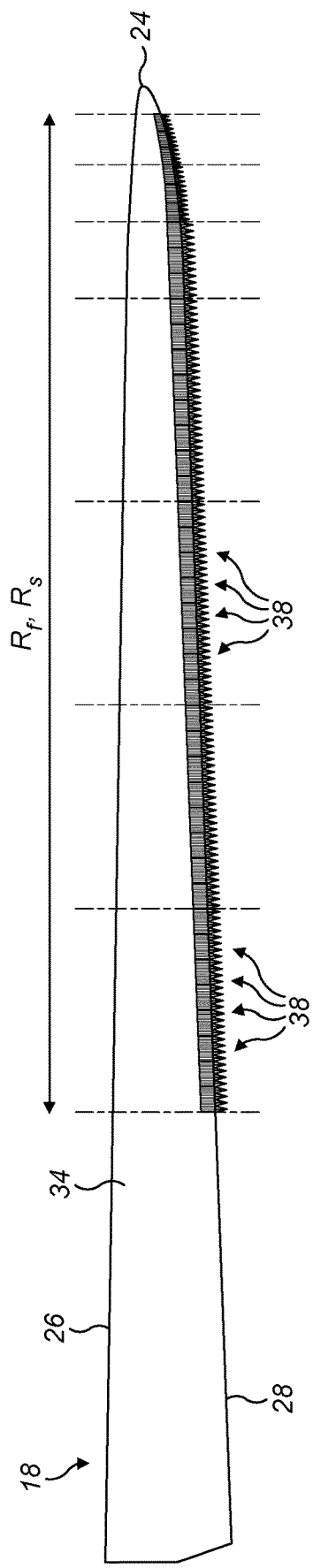
FIG. 7 is a plan view of the rotor blade of FIG. 2 including a series of trailing edge modules.
Figure 8:
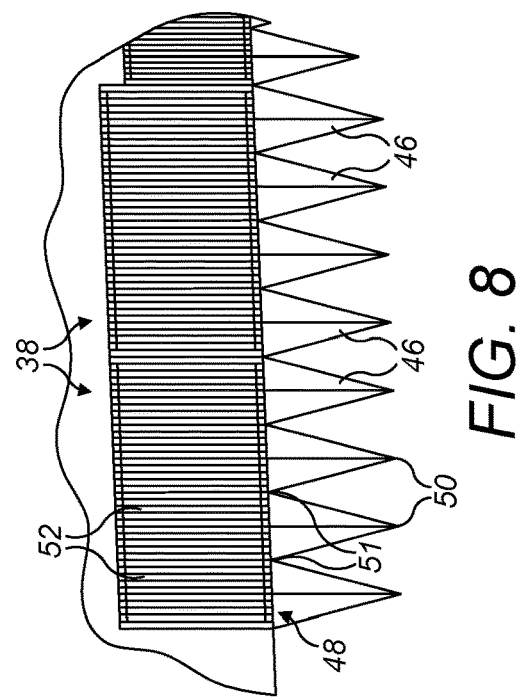
FIG. 8 is a detail view of a portion of the trailing edge of the rotor blade shown in FIG. 7.

FIG. 4 shows the trailing edge module 38 in more detail, and FIG. 5 provides an enlarged view of an area of the trailing edge module 38 highlighted in FIG. 4. FIG. 6 shows a trailing edge module 38 in isolation, FIG. 7 shows in plan view a series of trailing edge modules 38 installed side-by-side along a portion of the blade trailing edge 28, and FIG. 8 provides a detail view of two of the modules of the FIG. 7 arrangement. The following description of the trailing edge module 38 therefore refers to FIGS. 3 to 8 collectively.

The trailing edge module 38 is described below in its context as installed on the blade 18, and so references in the below description to features of the module 38 relating to the chordwise or spanwise direction should be understood in that context.

Referring firstly to FIG. 4, the trailing edge module 38 comprises a generally oblong base plate 40 that is arranged on the blade 18 in the trailing edge region 32, with a short side of the base plate 40 generally aligned with the trailing edge 28 of the blade 18. The base plate 40 is attached to the blade 18 by any suitable means, including by adhesives and/or using mechanical fixings such as screws or rivets. The trailing edge module 38 may also be embedded in the leeward half shell during moulding.

The base plate 40 has a lower surface that engages the blade 18 and is shaped to follow the curvature of the blade 18. The base plate 40 is substantially uniform in thickness and so defines an upper surface of complementary shape to the lower surface.

With continued reference to FIGS. 4 and 5, the trailing edge module 38 further includes a locator in the form of a lip 44 that extends generally orthogonally from the end of the base plate 40 disposed at the trailing edge 28—and downwardly in the orientation shown in FIGS. 3 to 5—to overhang the trailing edge 28 of the blade 18. The lip 44 therefore aids location of the trailing edge module 38 on the blade 18.

The lip 44 also supports a series of teeth or serrations 46, which project from a surface of the lip 44 generally outwardly from the blade 18 in a generally chordwise direction.

In this respect, references in this description to a 'generally chordwise direction' are intended to indicate a direction that is close to the chordwise direction C, namely aligned with the blade chord, or at least closer to the chordwise direction C than to the spanwise direction S. Moreover, although the chord is confined to within the extremities of the blade 18, references to a 'generally chordwise direction' may relate to features outside those extremities extending in the same direction, such as the serrations 46.

As best seen in FIG. 8, each serration 46 is generally triangular in plan view, extending from a base 48 at the lip 44 of the trailing edge module 38 to a serration tip 50 to define a length $L_s$ of the serration 46 as shown in FIG. 5. Correspondingly, the size of a base 48 of a serration 46 in the spanwise direction defines a width $W_s$ of the serration 46.

The spanwise edges 51 of bases 48 of neighbouring serrations 46 coincide, so that the series of serrations 46 creates a sawtooth profile in plan view. The spanwise edges 51 of a serration 46 are indicated in FIG. 8 for clarity.

The triangular profile of each serration 46 may define an isosceles triangle that is symmetrical about an axis intersecting the serration tip 50. However, for optimised performance the serrations 46 are typically oriented to align with an airflow direction for the rated speed of the blade 18, so that the serrations 46 are slightly skewed and therefore scalene in plan view, in that a line connecting the serration tip 50 and the midpoint of the base 48 of a serration 46 is oblique to the base 48.

Since the serrations 46 cover the trailing edge 28 of the blade 18, they may be regarded as projecting from the trailing edge 28. Equally, the serrations 46 may be considered to replace the original trailing edge 28, so that the area of the blade 18 occupied by the trailing edge module 38 has a serrated trailing edge. In either case, for portions of the trailing edge 28 occupied by serrations 46, the blade chord is defined by the distance between the leading edge 26 and the base 48 of a serration 46, as is conventional.

As best seen in FIGS. 3 to 5, a series of fins 52 project orthogonally from the upper surface of the base plate 40. Preferably, the fins 52 are parallel to each other. Accordingly, the fins 52 also project from the surface of the blade 18 insofar as they project relative to the blade surface.

In this example, the fins 52 of the trailing edge module 38 are identical to one another.

The fins 52 are thin in the spanwise direction and elongate in the chordwise direction. As FIG. 5 shows, each fin 52 has parallel planar side walls 54 that are orthogonal to the upper surface of the base plate 40 and are joined by a transverse wall 55 having a width defining the fin thickness $T_f$. The side walls 54 extend along substantially the entire length of the base plate 40 in a generally chordwise direction. Each fin 52 extends between a trailing end 56 and a leading end 58 to define a length $L_f$ of the fin 52, as shown in FIG. 4.

Each trailing end 56 may coincide with the lip 44 of the trailing edge module 38, so that each fin 52 may terminate at the base 48 of a serration 46 with which the fin 52 is in spanwise alignment. Each leading end 58 lies upstream of its respective trailing end 56, and so each fin 52 is entirely upstream of the serration 46 that it is aligned with. In other words, there is no chordwise overlap between each fin 52 and its respective serration 46; although the trailing end 56 of a fin 52 may coincide with the base 48 of the serration 46 that the fin 52 is aligned with, the fin 52 does not extend onto its respective serration 46.

The fins 52 are arranged on the trailing edge module 38 such that, like the serrations 46, the fins 52 are substantially aligned to the rated airflow direction for the blade 18. So, although the side walls 54 of the fins 52 extend generally chordwise as noted above, they may be slightly inclined relative to the blade chord and therefore not strictly chordwise.

As seen most clearly in FIGS. 4 and 5, the height $H_f$ of each fin 52 increases linearly from zero at the leading end 58 until reaching an apex 60 slightly upstream of the trailing end 56. Downstream of the apex 60 the fin 52 curves sharply, so that the height of the fin 52 reduces back to zero at the trailing end 56. The transverse wall 55 of the fin 52 therefore merges with the upper surface of the base plate 40 at the leading end 58 of the fin 52 and curves back to reconnect with the upper surface at the trailing end 56, thereby avoiding presenting any hard edges towards airflow across the suction side 34 of the blade 18 that could scatter vortices and create noise.

As noted above, trailing edge noise is most prevalent in the outer regions of the rotor 16. Accordingly, as FIG. 7 shows, a row of trailing edge modules 38 are installed in the outer portion of the blade 18, almost up to the blade tip 24. The row of trailing edge modules 38 defines a combined series of fins 52 having an overall spanwise range $R_f$, and a combined series of serrations having an overall spanwise range $R_s$. In the FIG. 7 example the respective spanwise ranges of the fins and serrations are equal so that the series of serrations 46 is coextensive with the series of fins 52 along the trailing edge 28.

As most clearly represented in FIG. 5, the fin spacing $S_f$ is such that each serration 46 has multiple fins 52 aligned with it in the spanwise direction S. Specifically, FIG. 5 shows three or four fins 52 aligned with each serration 46. In this respect, a fin 52 is considered aligned with a serration 46 if the trailing end 56 of the fin 52 is aligned with any part of the base 48 of the serration 46 in the spanwise direction S.

Accordingly, the fins 52 may be regarded as being divided into sets, each set being associated with a respective serration 46 with which the fins 52 of the set are aligned. Conversely, each serration 46 is associated with a respective one of the sets of fins 52, so that each fin 52 is uniquely associated with a particular serration 46. In other words, the fins 52 are divided into subsets where each subset comprises a respective distinct set of fins associated with, and arranged adjacent to, each of the serrations.

Each set (or subset) of fins comprises multiple fins whose trailing ends are in spanwise alignment with the base of the serration associated with the set. This means that in plan view the individual fins of a set are located at or between the spanwise edges 51 of the serration 46.

It follows that, for each subset, each fin 52 is entirely upstream of the serration 46 associated with the subset. As each subset includes multiple fins 52, it is also the case that at least one fin 52 of each subset must have a trailing end 56 that lies between spanwise edges 51 of the base 48 of the serration 46 associated with the subset.

It is also noted that, as FIG. 4 makes clear, the fins 52 are longer than the serrations 46, and preferably substantially longer. As will be explained in more detail below, the lengths of the fins 52 and the serrations 46 are determined as a function of the local blade chord, and so it is possible that some serrations 46 will be longer than some fins 52. For example, a serration 46 disposed near the root 22 of the blade 18 could be longer than a fin 52 positioned near the blade tip 24. However, for each subset of fins 52, the fins 52 and the serration 46 associated with the subset are sized according to the same local chord, and so each fin 52 is longer than the serration 46 it is aligned with.

As noted above, the fins 52 and the serrations 46 cooperate with each other to break down vortices travelling towards and across the trailing edge 28 in a two-stage process, thereby reducing trailing edge noise when the blade 18 is in use.

In this respect, the fins 52 act in a manner analogous to a knife in that they slice through and therefore split vortices flowing along them into smaller, lower energy vortices. For this reason, there is a benefit to having multiple fins 52 for each serration 46, as increasing the number of fins 52 provides a corresponding increase in the proportion of vortices that impact and are therefore split by one of the fins 52. It is also noted, however, that there is a limit to the number of fins 52 that can be included before their effectiveness starts to diminish, as the gaps between neighbouring fins 52 must be of a certain size for the fins 52 to split vortices effectively.

By breaking down vortices flowing towards the trailing edge 28, the presence of the fins 52 ensures that the vortices reaching the serrations 46 are smaller and have less energy, on average, compared with a more conventional serrated trailing edge arrangement without fins 52. As the serrations 46 dissipate a substantially fixed proportion of the energy remaining in the vortices that reach them, it follows that more turbulent energy will be dissipated in total in the present example compared with an arrangement having only serrations 46. In this way, the level of noise produced at the trailing edge 28 is reduced.

Recognising this advantage of combining fins 52 and serrations 46, embodiments of the invention capitalise on the synergistic effect by taking the opportunity to reduce the size of the serrations 46 when combined with fins 52, noting that improved noise reduction can be achieved with a combination of fins 52 and serrations 46 compared to a serrations-only arrangement; even if the serrations 46 are smaller in the combined configuration.

Reducing the size of the serrations 46 in turn reduces the load that they impart on the blade 18 and so offers benefits in terms of the performance of the turbine 10.

Specific geometries for the fins 52 and serrations 46 that make use of this principle shall now be considered.

In general terms, the fins 52 and serrations 46 are sized in accordance with the dimensions and characteristics of the boundary layer for the rated wind speed for the relevant spanwise position on the blade 18. These characteristics include the predicted position of the transition point 53 at which the boundary layer becomes turbulent, for example. As the skilled reader will appreciate, the boundary layer can be modelled around the blade 18 by calculating the Reynolds number, the Mach number and the angle of attack for the rated wind speed, as is conventional.

Ideally, the fins 52 extend chordwise through the majority of the turbulent portion of the boundary layer, as testing has shown that longer fins 52 contribute a greater noise reduction. However, the length of each fin 52 is constrained by a need to avoid the fins 52 extending to the transition point 53, so that they are not exposed in a laminar-to turbulent transition region which may generate extra noise caused by flow separation. So, the fins 52 are configured such that their leading ends 58 are downstream of the transition point 53. For example, the leading end 58 of each fin 52 may be spaced from the predicted transition point 53 by 10-30% of the local blade chord.

In the present example, the height $H_f$ of each fin 52 varies in the chordwise direction C, although in other examples some or all of the fins 52 are uniform in height. In all cases, typically the fin height $H_f$ never exceeds the boundary layer thickness to ensure the fin 52 does not protrude outside the boundary layer, taking into account also the thickness of the base plate 40. In this respect, the base plate 40 typically has a thickness of no more than half of the boundary layer thickness, to avoid causing vortex shedding.

In the context of these general considerations, specific geometries for the fins 52 and serrations 46 have been developed, as set out below. In broad terms, each dimension of the fins 52 and serrations 46 is expressed in terms of a limited range of the local blade chord, or as a function of other dimensions. Although the specific value selected from each of those ranges will vary depending on the application, it is noted that the same value will generally be used for all fins 52 or serrations 46 of a given blade 18. So, for example, each fin 52 on the blade 18 has a length corresponding to the same proportion of the local blade chord.

Starting with the fins 52, the following dimensions are used:
fin length, $L_f$=10% to 40% of blade chord;
fin height at apex, $H_f$=0.2% to 5% of blade chord;
overall spanwise range of series of fins, $R_f$=10% to 40% of outer blade span;
fin spacing, $S_f$=$H_f$/2; and
fin thickness, $T_f$=$H_f$/8.

For the serrations 46, in an arrangement lacking fins 52 the following geometry would ordinarily be applied:
serration length, $L_s$=8% to 20% of blade chord;
overall spanwise range of series of serrations, $R_s$=10% to 40% of outer blade span; and
serration width, $W_s$=$0.2L_s$ to $0.5L_s$.

It is noted that these dimensions lead to an aspect ratio of between 2 and 5 for each serration 46, the aspect ratio being the ratio of the length to the width of the serration 46.

As noted above, shorter serrations 46 can be used when the serrations 46 are combined with fins 52, thereby reducing the load imparted by the serrations 46 on the blade 18. Accordingly, in the present example the serration geometry is modified, as follows:
modified serration length, $L_s'$=$L_s$−$H_f$/a, where 'a' is a constant between 1 and 10; and
modified serration width, $W_s'$=$0.2L_s'$ to $0.5L_s'$.

So, the serration length $L_s$ is reduced by a fraction of the fin height $H_f$ in the combined arrangement, and the serration width $W_s$ is based on the modified serration length $L_s'$ and so exhibits a corresponding reduction. The aspect ratio is therefore unchanged by the modified serration geometry.

It is noted that it remains possible to express any of the above given dimensions for the fins 52 and serrations 46 solely in terms of the blade chord and the constant 'a'. Doing so for the serration length $L_s'$ reveals that, in the modified case, the serration 46 may have a length of between 3% (when 'a' is 1) and 19.98% (when 'a' is 10) of the blade chord. Thus, serrations 46 may be shorter when the modified dimensions are applied than for the standard case.

As can be seen from above, the fin spacing is dependent on the height of the fins. Meanwhile, the height of the fins is dependent on blade chord. The serration width is also dependent on the blade chord, but the serration width is greater than the fin spacing. This means that there will multiple fins aligned with an individual serration. In particular, there may be at least three fins or at least fours aligned with an individual serration. As described previously, the fins split vortices flowing along them into smaller, lower energy vortices and there is a benefit to having multiple fins for each serration, as increasing the number of fins provides a corresponding increase in the proportion of vortices that impact and are therefore split by one of the fins.

It follows from the above that a fin 52 or serration 46 at one spanwise position on the blade 18 will have different dimensions to a corresponding fin 52 or serration 46 at another spanwise position on the blade 18, due to the varying blade chord. Although ideally each fin 52 and serration 46 would be sized uniquely according to the blade chord at the specific spanwise position of the fin 52 or serration 46, it is more practical to form the fins 52 and serrations 46 in groups.

So, in the example described above in which fins 52 and serrations 46 are added to the blade 18 as part of a trailing edge module 38, conveniently each fin 52 of a given trailing edge module 38 has the same dimensions, which are based on the average chord across the spanwise extent of the trailing edge module 38, once installed on the blade 18. The same applies to the serrations 46, which also are all sized according to the average chord for the trailing edge module 38.

Indeed, to simplify manufacture neighbouring trailing edge modules 38 may also be identical, allowing the trailing edge modules 38 to be produced in larger batches and thus improving manufacturing efficiency. This approach leads to notable step changes in the fin and serration geometry at certain points along the trailing edge 28, which can be seen in FIGS. 7 and 8.

FIG. 7 shows a complete assembly of trailing edge modules 38 along the trailing edge 28 of the blade 18. As the vertical dashed lines in FIG. 7 indicate, the trailing edge 28 is zoned, and the trailing edge modules 38 in each zone have identical fins 52 and serrations 46 to one another, the dimensions of the fins 52 and serrations 46 being based on the average blade chord for the zone.

As seen more clearly in the detail view of FIG. 8, the fins 52 and serrations 46 become smaller when transitioning to an adjacent zone moving towards the blade tip 24, due to the reducing blade chord. In this respect, FIG. 8 shows a junction between two zones, and makes clear the step change in serration and fin geometry at that junction, which is exaggerated in FIG. 8 for illustrative purposes.

The dimensions of each trailing edge module 38, such as the chordwise length of the base plate 40 and/or the fins 52, may be configured to account for practical considerations that apply to the position the trailing edge module 38 will occupy on the blade 18 once installed. Such considerations may include the need to accommodate clamps during installation as noted above, or to accommodate sensors or other features of the blade 18.

Although FIG. 7 shows a series of serrations 46 that is coextensive with the series of fins 52 along the trailing edge 28, in other examples this may not be the case. For example, in some applications it may be advantageous to omit fins 52 along certain portions of the trailing edge, such that there are serrations 46 present having no fins 52 associated with them. Similarly, it is also possible to omit serrations 46 but retain fins 52 in some parts of the blade 18.

While the approach illustrated in FIGS. 7 and 8 entails a slight lack of optimisation of the geometry for the fins 52 and serrations 46, if offers considerable benefits in terms of batch production. The precise manner in which this approach is implemented is therefore determined to balance these conflicting demands, to ease manufacture as far as possible whilst providing a desired level of trailing noise reduction.

Many modifications may be made to the examples described above without departing from the scope of the present invention as defined in the accompanying claims. In particular, the manner in which the fins and serrations are added to the blade can vary widely. As noted above, the fins and/or the serrations may be formed integrally with the blade shell during moulding.

Alternatively, a dedicated subassembly may be provided for one or both of the fins and serrations. For example, the base plate and the lip of the trailing edge module described above could be formed and attached to the blade separately.

In a further alternative, fins formed on a first base plate could be attached to the suction side of the blade, while serrations are added to the trailing edge by way of a second base plate attached to the pressure side, or vice versa.

The invention claimed is:

1. A wind turbine rotor blade, the rotor blade extending in a spanwise direction between a root end and a tip end, and extending in a chordwise direction between a leading edge and a trailing edge, the rotor blade including a trailing edge module, comprising:
    a base plate configured to be mounted to the rotor blade, the base plate including a locator that projects from the base plate to locate the trailing edge module on the rotor blade;
    a series of serrations projecting from the locator of the trailing edge module at the trailing edge of the rotor blade, each serration extending from a base to a tip to define a length of the serration; and
    a respective distinct set of fins arranged on the base plate, each respective distinct set of fins being associated with, and arranged adjacent to, each of the serrations, each fin projecting from a surface of the base plate of the trailing edge module and extending along the base plate between a leading end and a trailing end to define a length of the fin;
    wherein each set of fins comprises multiple fins whose trailing ends are in spanwise alignment with, and are located at or upstream of, the base of the serration associated with the set;
    wherein the locater is located between the trailing end of each set of fins and the serration associated with the set; and
    wherein, for each set of fins, each fin of the set has a greater length than the serration associated with the set, and the trailing end of at least one fin lies between spanwise edges of the serration associated with the set.

2. The rotor blade of claim 1, wherein each fin has a length corresponding to at least 10% of a blade chord at the spanwise position of the fin.

3. The rotor blade of claim 2, wherein each fin has a length corresponding to at least 20% of a blade chord at the spanwise position of the fin.

4. The rotor blade of claim 1, wherein each leading end of each fin is positioned downstream of a transition point.

5. The rotor blade of claim 4, wherein each leading end is spaced from the transition point by between 10% and 30% of the blade chord.

6. The rotor blade of claim 1, wherein each serration has a length that is between 3% and 20% of a blade chord at the spanwise position of the serration.

7. The rotor blade of claim 6, wherein each serration has a length that is between 3% and 8% of a blade chord at the spanwise position of the serration.

8. The rotor blade of claim 1, wherein for each set of fins the trailing ends of two or more of the fins lie between spanwise edges of each serration.

9. The rotor blade of claim 1, wherein the fins are spaced from each other according to their respective heights.

10. The rotor blade of claim 1, wherein each pair of adjacent fins within the set of fins are spaced by a gap no larger than half of the height of one of the fins of the pair.

11. The rotor blade of claim 1, wherein each set of fins comprises at least three fins, or at least four fins.

12. The rotor blade of claim 1, wherein, for each set of fins, the trailing ends of at least one fin coincides with the base of the serration associated with the set.

13. The rotor blade of claim 1, wherein at least some of the fins are disposed on a suction side of the blade.

14. The rotor blade of claim 13, wherein at least some of the fins are disposed on a pressure side of the blade.

15. The rotor blade of claim 1, wherein the locator comprises a lip configured to overhang the trailing edge of the rotor blade.

16. The rotor blade of claim 1, wherein each fin of the set of fins includes a pair of sidewalls, each sidewall being planar along the length and a height of each fin.

17. The rotor blade of claim 1, wherein each of the set of fins includes an apex along its length, the apex being upstream of the trailing end of each fin.

18. A wind turbine comprising the rotor blade of claim 1.

19. A method of manufacturing a wind turbine rotor blade, the rotor blade extending in a spanwise direction between a root end and a tip end, and extending in a chordwise direction between a leading edge and a trailing edge, the method comprising:
    providing a trailing edge module comprising a base plate configured to be mounted to the rotor blade, the base plate including a locator that projects from the base plate to locate the trailing edge module on the rotor blade, a series of serrations that project from the locator, and a plurality of fins that project from the base plate, each fin extending along the base plate between a leading end and a trailing end to define a length of the fin, wherein the locater is arranged between the trailing end of each set of fins and the serration associated with the set;
    arranging the trailing edge module such that the series of serrations project from the trailing edge, each serration extending from a base to a tip to define a length of the serration; and
    arranging the trailing edge module such that the plurality of fins project from a surface of the blade, each fin extending between a leading end and a trailing end to define a length of the fin, each fin belonging to a respective distinct set of fins associated with, and arranged adjacent to, each of the serrations;
    wherein each set of fins comprises multiple fins whose trailing ends are in spanwise alignment with, and are located at or upstream of, the base of the serration associated with the set; and
    wherein, for each set of fins, each fin of the set has a greater length than the serration associated with the set, and the trailing end of at least one fin lies between spanwise edges of the serration associated with the set.

20. The method of claim 19, comprising determining the length of each serration in accordance with a height of a fin of a set of fins associated with the serration.

21. The method of claim 19, comprising determining a width of each serration at its base as a function of the length of the serration.

22. The method of claim 19, comprising determining a spanwise thickness of each fin as a function of a height of the fin.

* * * * *